(No Model.)

G. W. BEDBURY.
CAR AXLE.

No. 284,800. Patented Sept. 11, 1883.

Witnesses
F. R. Strong.
H. M. Brackett

Inventor
George W. Bedbury
By D. P. Kennedy
atty

UNITED STATES PATENT OFFICE.

GEORGE W. BEDBURY, OF PORTLAND, OREGON, ASSIGNOR OF ONE-HALF TO L. M. COX AND JAMES E. McLAUGHLIN, OF SAME PLACE.

CAR-AXLE.

SPECIFICATION forming part of Letters Patent No. 284,800, dated September 11, 1883.

Application filed May 12, 1883. (No model.)

*To all whom it may concern:*

Be it known that I, GEORGE W. BEDBURY, a citizen of the United States, residing at the city of Portland, in the county of Multnomah and State of Oregon, have invented certain new and useful Improvements in Car-Axles for Railroads, of which the following is a specification.

My invention relates to and is an improvement upon Letters Patent No. 275,324, granted to me April 3, 1883, for improvement in car-axles; and my invention consists in constructing the axle in two pieces and locating upon one piece a hub, and upon the other part a spindle, said spindle being adapted to rotate within said hub. Both parts of axle are drilled or otherwise fitted to receive a loose journal or connecting center, which moves independently therein. Flange-pieces, forming a circle of the same diameter as the hub-rim, are placed upon the spindle, provided with slotted holes to receive the bolts and nuts, or other suitable connecting means, by which these flange-pieces are made fast to the rim of hub, whereby the spindle is held in its proper position to rotate within the hub. The slotted holes are employed to permit of adjustment of the flange-pieces in case of wear upon the spindle.

Figure 3:
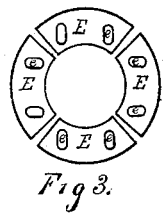
Figure 1:
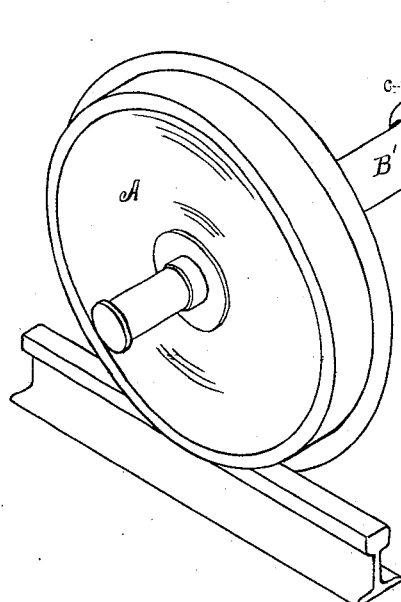
Figure 2:
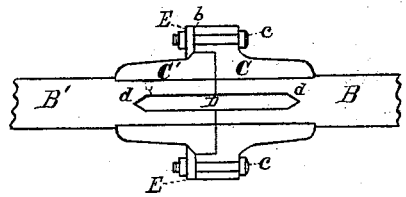

In the accompanying drawings, forming part of this specification, Figure 1 is a view in perspective of my invention. Fig. 2 is a view in section of the hub, spindle, center journal, connecting-flanges, and means of connecting; and Fig. 3 is an end elevation of the flanges, showing the slotted holes.

A A in Fig. 1 represent the wheels.

B B' represent the two parts of axle. Part B has upon it a hub, C, which fits over the axle B, and has a flange, b, inside of which the collar C' of part B' rotates. Collar C' is placed around the axle, similar to hub C.

D is the connecting-center, and is simply a loose journal, which is adapted to rotate independently within the sockets d d of spindle C' and hub C. It strengthens the attachment and also obviates friction of the various parts of the apparatus.

E E are the flange-pieces, provided with slotted holes e e, as shown in Fig. 3, their inner surfaces impinging upon spindle C'. The holes e e permit adjustment upon spindle C' in case of wear and the connection becoming loose. The rim or flange b of hub C is also perforated to receive the bolts and nuts c c, by which the flange-pieces E E and flange b are fastened snugly together, and the parts B B' of axle held in position. The flange-pieces may be divided into any number of parts, in three pieces, or otherwise.

The operation of my invention is as follows: When the car strikes a curve, then there will be an independent movement by means of the spindle rotating in the hub, and one wheel will be permitted to rotate faster than the wheel on the opposite rail of the track.

I claim that my present invention, described herein, by reason of the arrangement of parts, the breadth of surface of bearing and rotating points, obviates any possibility of friction beyond reasonable wear, and the apparatus is easily adjusted and very strong.

Having described my invention, what I claim as new, and desire to secure by Letters Patent, is—

In combination with parts of axle B B', hub C, and collar C' of flange-pieces E E, having holes e e, and the center loose journal, D, adapted to rotate within sockets d d, for the purpose described.

GEORGE W. BEDBURY.

Witnesses:
 JAS. U. POWELL,
 FRED WATKINS.